(12) United States Patent
Effernelli

(10) Patent No.: US 11,247,273 B2
(45) Date of Patent: Feb. 15, 2022

(54) ADDITIVE MANUFACTURING PLATE EQUIPPED WITH A STIFFENER IN THE FORM OF A PANEL HOLLOWED OUT IN A PORTION OF THE THICKNESS OF SAME

(71) Applicant: COMPAGNIE GENERALE DES ETABLISSEMENTS MICHELIN, Clermont-Ferrand (FR)

(72) Inventor: Albin Effernelli, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 558 days.

(21) Appl. No.: 16/308,120

(22) PCT Filed: May 18, 2017

(86) PCT No.: PCT/EP2017/062010
§ 371 (c)(1),
(2) Date: Dec. 7, 2018

(87) PCT Pub. No.: WO2017/211566
PCT Pub. Date: Dec. 14, 2017

(65) Prior Publication Data
US 2019/0176235 A1    Jun. 13, 2019

(30) Foreign Application Priority Data
Jun. 9, 2016 (FR) .................................. 1655293

(51) Int. Cl.
*B29C 64/153* (2017.01)
*B29C 64/245* (2017.01)
(Continued)

(52) U.S. Cl.
CPC .............. *B22F 12/00* (2021.01); *B22F 12/30* (2021.01); *B29C 64/153* (2017.08);
(Continued)

(58) Field of Classification Search
CPC ............................. B29C 64/245; B22F 12/30
See application file for complete search history.

(56) References Cited

U.S. PATENT DOCUMENTS 6,367,791 B1   4/2002  Calderon et al.
2016/0052207 A1   2/2016  Bloom
(Continued)

FOREIGN PATENT DOCUMENTS

EP    2 617 554 A1    7/2013

OTHER PUBLICATIONS

International Search Report dated Aug. 17, 2017, in corresponding PCT/EP2017/062010 (6 pages).

*Primary Examiner* — Mary Lynn F Theisen
(74) *Attorney, Agent, or Firm* — Venable LLP

(57) ABSTRACT

An additive manufacturing plate (10) comprises a main body (32), this main body (32) taking the form of a panel, and the main body (32) comprising an upper face on which the components are manufactured directly. The additive manufacturing plate comprises a stiffener (12) that is independent of the main body (32) and secured to the lower face (34) of the main body, this stiffener (12) taking the form of a panel (36) and the panel (36) being hollowed out but only through a part of its thickness (E36). The stiffener (12) makes it possible to avoid excessive deformations of the additive manufacturing plate during the manufacturing process and is reusable.

8 Claims, 2 Drawing Sheets

(51) Int. Cl.
  *B33Y 10/00* (2015.01)
  *B33Y 30/00* (2015.01)
  *B22F 12/30* (2021.01)
  *B22F 12/00* (2021.01)
  *B22F 10/10* (2021.01)
  *B22F 3/10* (2006.01)

(52) U.S. Cl.
  CPC ............ *B29C 64/245* (2017.08); *B22F 10/10* (2021.01); *B22F 2003/1042* (2013.01); *B33Y 10/00* (2014.12); *B33Y 30/00* (2014.12); *Y02P 10/25* (2015.11)

(56) References Cited

U.S. PATENT DOCUMENTS

| | | | |
|---|---|---|---|
| 2017/0151631 A1* | 6/2017 | Kuo | ........................ B33Y 50/02 |
| 2018/0193887 A1 | 7/2018 | Pourcher et al. | |
| 2018/0215097 A1 | 8/2018 | Pourcher et al. | |
| 2018/0236504 A1 | 8/2018 | Pourcher et al. | |
| 2019/0009334 A1 | 1/2019 | Effernelli et al. | |

\* cited by examiner

ADDITIVE MANUFACTURING PLATE EQUIPPED WITH A STIFFENER IN THE FORM OF A PANEL HOLLOWED OUT IN A PORTION OF THE THICKNESS OF SAME

BACKGROUND

The invention falls within the field of powder-based additive manufacturing by sintering or melting grains of this powder using a laser beam and/or an electron beam.

More specifically, the invention relates to the geometric quality of the components manufactured.

Sintering or melting grains of power are manufacturing processes which bring about residual stresses in the manufactured components, and these residual stresses are likely to cause significant deformations of the additive manufacturing plate on which these components are manufactured. Significant deformations are understood to be deformations of a few tenths of a millimetre to a few millimetres, the amplitude of the deformations varying depending on the type of powder and the geometry of the components manufactured.

A first drawback is that when an additive manufacturing plate deforms significantly during the manufacturing process, the components supported by this plate can no longer be manufactured respecting the dimensional manufacturing tolerances.

Another drawback is that, in the scope of additive manufacturing by powder-bed deposition, significant deformations of the manufacturing plate can result in the roller and/or the scraper of the powder-bed deposition device rubbing on the components while they are being manufactured. This rubbing of the roller can damage the components while they are being manufactured and result in a lengthy stoppage of the additive manufacturing machine.

Therefore, the objective of the present invention is to counter at least one of the abovementioned drawbacks.

SUMMARY

To this end, the subject of the invention is an additive manufacturing plate intended to serve as a support for the manufacturing of at least one component by an additive manufacturing process, the plate comprising a monolithic main body that acts as a manufacturing support, this main body taking the form of a panel, the length and the width of this panel being greater than the thickness of this panel, and the main body comprising an upper face on which the components are manufactured directly.

According to the invention, the additive manufacturing plate comprises a stiffener that is independent of the main body and secured to the lower face of the main body, this stiffener also taking the form of a panel of which the length and the width are greater than the thickness thereof, and the panel forming this stiffener being hollowed out in its thickness.

Still according to the invention, the panel forming the stiffener is not hollowed out through its entire thickness. Preferably, the hollows made in the panel open out only onto the lower face of the panel and not onto the upper face of this panel.

By increasing the rigidity of the additive manufacturing plate, the stiffener according to the invention counters the excessive deformations of the additive manufacturing plate during the manufacturing process, thereby making it possible to respect the manufacturing tolerances of the manufactured components and to avoid a lengthy stoppage of the additive manufacturing machine.

According to another advantage, the stiffener can be removed from the additive manufacturing plate when this plate is too worn and remounted on a new plate before the assembly formed by the new plate and the stiffener is machined to the desired tolerances.

Advantageously, the stiffener also makes it possible to limit the deformations of the additive manufacturing plate when the plate and the manufactured components are placed in a furnace in order to carry out a heat treatment for relieving the manufactured components of residual stresses originating from the manufacturing process.

Finally, by being hollowed out in its thickness, the stiffener affords a better compromise between the rigidity conferred on the additive manufacturing plate and the additional weight that it represents.

BRIEF DESCRIPTION OF THE FIGURES

Further features and advantages of the invention will become apparent from the following description. This description, given by way of non-limiting example, refers to the appended drawings, in which.

DETAILED DESCRIPTION

The invention relates to an additive manufacturing plate equipped with a stiffener.

Figure 1:
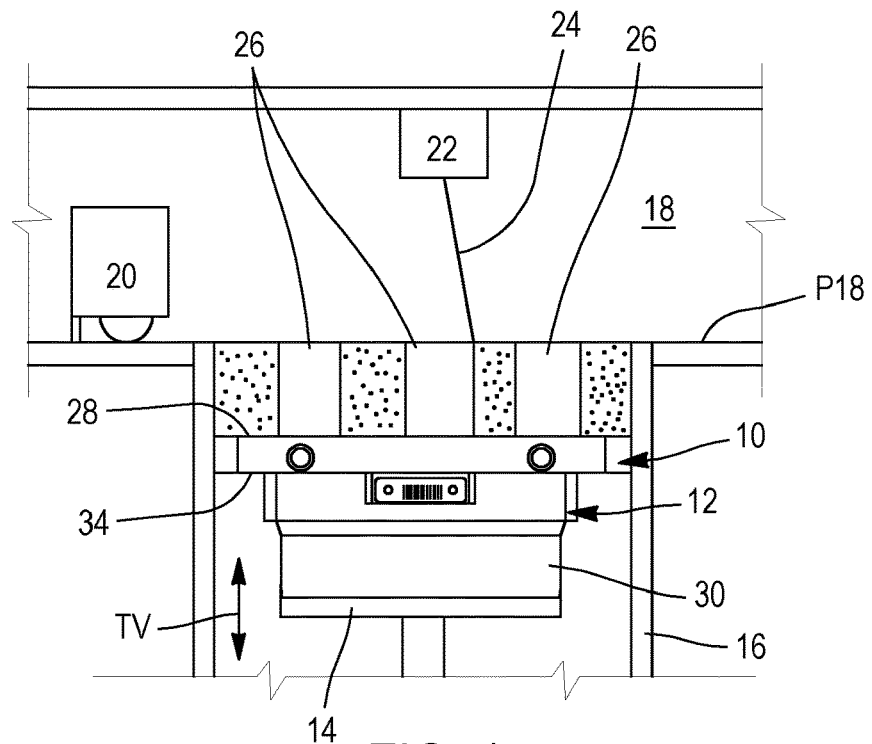
FIG. 1 is a view illustrating the use of an additive manufacturing plate equipped with a stiffener according to the invention within an additive manufacturing machine.

As illustrated in FIG. 1, the additive manufacturing plate 10 and the stiffener 12 thereof are intended to be used in an additive manufacturing machine (shown in part in FIG. 1) for implementing an additive manufacturing process.

More particularly, the plate 10 and the stiffener 12 thereof are used to implement an additive manufacturing process by powder-bed deposition.

To this end, the plate 10 and the stiffener 12 thereof are mounted on an actuator 14, such as the piston of a ram or the end of an endless screw, making it possible to slide the plate 10 and the stiffener thereof 12 in vertical translation inside a manufacturing sleeve 16 communicating with the manufacturing chamber 18 of the additive manufacturing machine.

In a known manner, the additive manufacturing machine comprises in its manufacturing chamber 18 a deposition device 20 for depositing several layers of additive manufacturing powder one after another on the plate 10 and at least one device 22 for emitting a beam 24 that can be a laser beam, an electron beam, or any other suitable beam.

As illustrated in FIG. 1, the actuator 14 can drive the plate 10 and the stiffener 12 thereof in vertical translation TV as far as the working plane P18 of the manufacturing chamber 18, and the actuator 14 can then lower the plate 10 and the stiffener thereof 12 step by step after every new deposition of a new layer of powder by the deposition device 20.

Upon every deposition of a new layer of powder, the grains of this new layer of powder are sintered or melted as per the contours determined by the shapes of the component(s) 26 to be manufactured. In the case of the present invention the component(s) 26 is/are manufactured directly on the upper face 28 of the additive manufacturing plate. Manufactured directly on the upper face 28 is understood to mean that the components 26 are secured to the manufacturing plate 10 at the end of the manufacturing process and subsequently have to be separated from the plate 10, for example by cutting using a wire.

In order to secure the plate 10 and the stiffener 12 thereof to the actuator 14, a connecting device 30 is provided. In the case of the present invention, this connecting device 30 preferably takes the form of a suction cup of circular section, such a connecting device presenting a lower risk of blockage in the case of deformation of the plate and a lower risk of malfunctioning or premature wear in contact with the powder than mechanical locking means.

Figure 2:
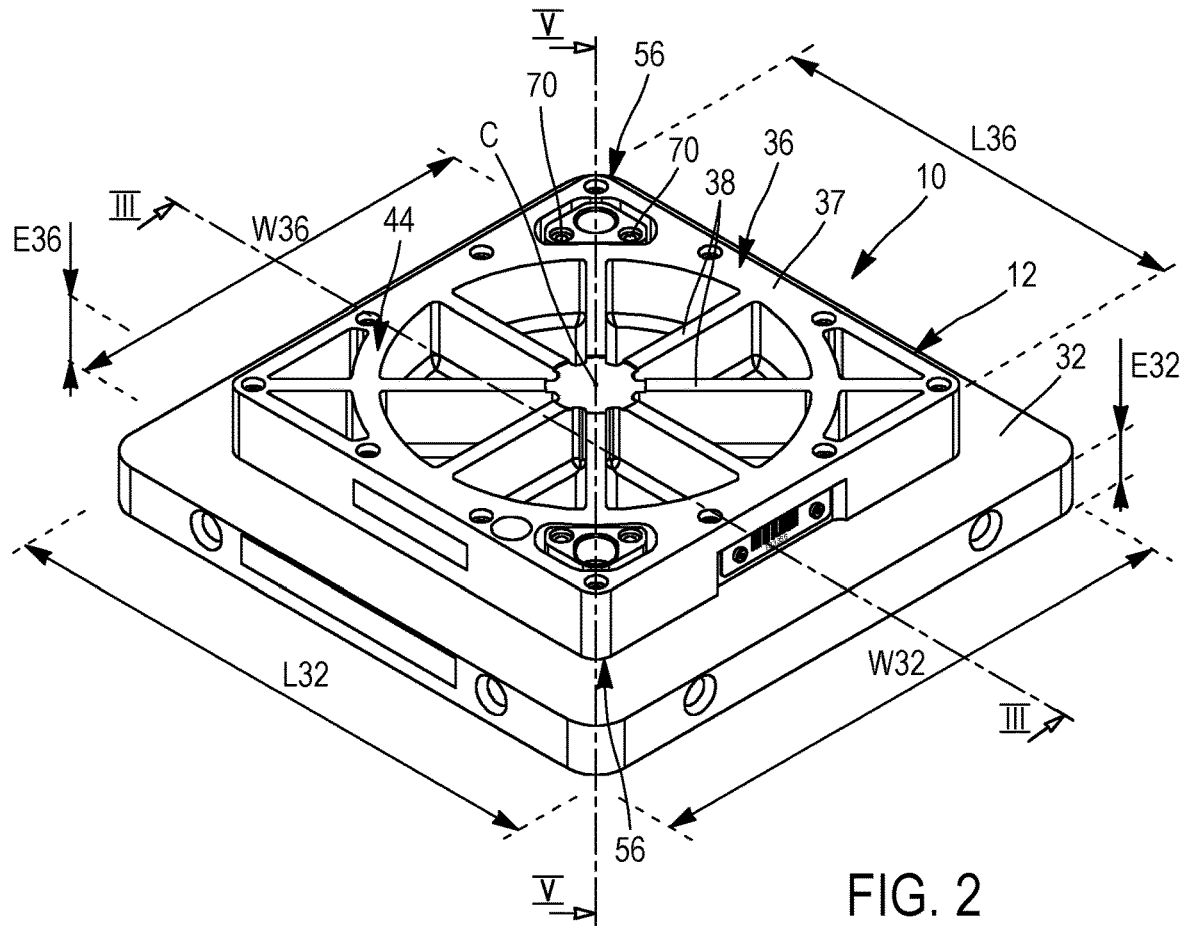
FIG. 2 is a perspective bottom view of an additive manufacturing plate equipped with a stiffener according to the invention.

As illustrated in FIG. 2, the plate 10 comprises a monolithic main body 32 that serves as a manufacturing support. This monolithic main body 32 takes the form of a panel, the length L32 and the width W32 of this panel being greater than the thickness E32 of this panel. As an indication, the length L32 and the width W32 are around ten times greater than the thickness E32 of this panel.

In the embodiment illustrated in FIG. 2, the length L32 and the width W32 of the panel forming the body 32 are equal and are around thirty-five centimetres.

As indicated above, the main body 32 comprises an upper face 28 on which the components 26 are manufactured directly.

Since the invention lies preferably in the scope of the additive manufacture of components 26 made of a metal alloy, the main body is also made of a metal alloy, preferably of 25CD4 steel for the additive manufacturing powder containing maraging steel, or of a titanium alloy for an additive manufacturing powder containing titanium, or of an aluminium alloy for an additive manufacturing powder containing aluminium.

In order to manufacture the components 26 within the manufacturing tolerances and to avoid a lengthy stoppage of the additive manufacturing machine, the plate 10 according to the invention is equipped with a stiffener 12 that is independent of the main body 32 and secured to the lower face 34 of the main body 32.

Still according to the invention, this stiffener 12 takes the form of a panel 36 of which the length L36 and the width W36 are greater than its thickness E36 and the panel 36 forming this stiffener 12 is hollowed out in its thickness E36. As an indication, the length L36 and the width W36 are around 6 to 7 times greater than the thickness E36 of this panel 36.

In order to make it easier to transport the plate 10 equipped with the stiffener 12 thereof on a conveyor belt and to allow the installation of a seal between the plate 10 and the manufacturing sleeve 16, the panel 36 has a width W36 less than the width W32 of the main body 32 and a length L36 less than the length L32 of the main body 32.

Preferably, the panel 36 forming the stiffener 12 is also made of a metal alloy, preferably S355 steel.

According to the invention and in order to reduce the manufacturing cost thereof, the main body 32 of the plate 10 and the panel 36 of the stiffener 12 are manufactured in bulk by a foundry casting process followed by machining.

Advantageously, by remaining integral with the plate 10 after the additive manufacturing process and following extraction of the plate 10 from the additive manufacturing chamber 18 with the components 26, the stiffener also makes it possible improve the rigidity of the plate 10 when this plate 10 and the manufactured components 26 are placed in a furnace in order to carry out a heat treatment for relieving the components 26 of residual stresses originating from the manufacturing process.

According to another advantage, the stiffener 12 makes it possible to improve the rigidity of the plate 10 at high temperatures, for example around 500° C., to which the plate 10 can be subjected during the additive manufacturing process or in the heat-treatment furnace.

As described above, the panel 36 forming the stiffener 12 is hollowed out in its thickness E36 in order to limit the additional weight imposed on the plate 10.

Figure 3:
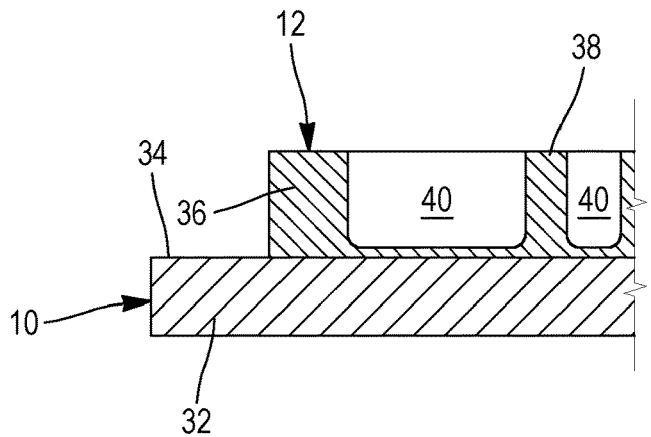
FIG. 3 is a cross-sectional view of an additive manufacturing plate equipped with a stiffener according to the invention.

In order to ensure proper operation of the connecting suction cup 30 without providing a perfectly tight connection between the stiffener 12 and the plate 10, the panel 36 forming the stiffener 12 is not hollowed out through its entire thickness E36. As shown in FIG. 3, the hollows 40 made in the panel 36 open out only onto the lower face 37 of the panel 36 and not onto the upper face 42 thereof.

It is preferable for the hollows 40 to open out onto the lower face 37 of the panel 36 in order to avoid trapping grains of additive manufacturing powder between the panel 36 and the main body 32.

In order to optimize the rigidity conferred on the plate 10 in spite of the hollows 40, the panel 36 forming the stiffener 12 is hollowed out in its thickness E36 so as to exhibit a ribbed structure in its width W36 and its length L36.

Preferably, the ribs 38 of the panel 36 form several branches around a central island C situated at the centre of the width W36 and of the length L36 of the panel 36 forming the stiffener 12. Thus, by extending from the central island C, the ribs 38 confer optimal rigidity on the stiffener 12 and thus on the plate 10.

In an optimum configuration, the ribs 38 form eight branches around the central island C, one branch extending every 45° around the central island C.

In order to secure the plate 10 and the stiffener 12 thereof to the actuator 14 via a suction cup 30 of circular section, the panel 36 comprises a lower surface 37 having an annular bearing surface 44 for receiving a suction cup 30 of circular section. This annular bearing surface 44 surrounds the ribs 38. Each branch formed by a rib 38 thus extends between the central island C and this annular bearing surface 44.

Figure 4:
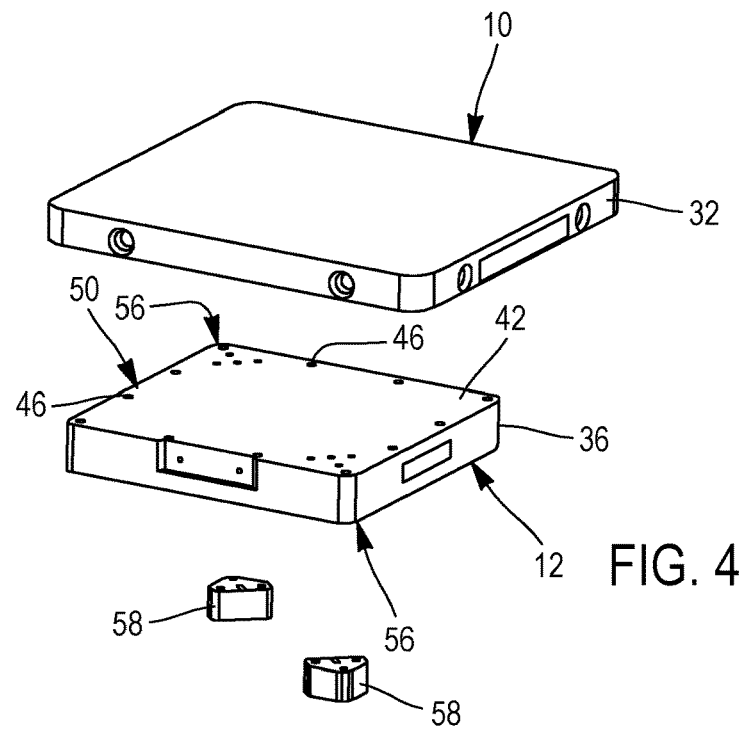
FIG. 4 is an exploded view of the mounting of a stiffener according to the invention under an additive manufacturing plate.
Figure 5:
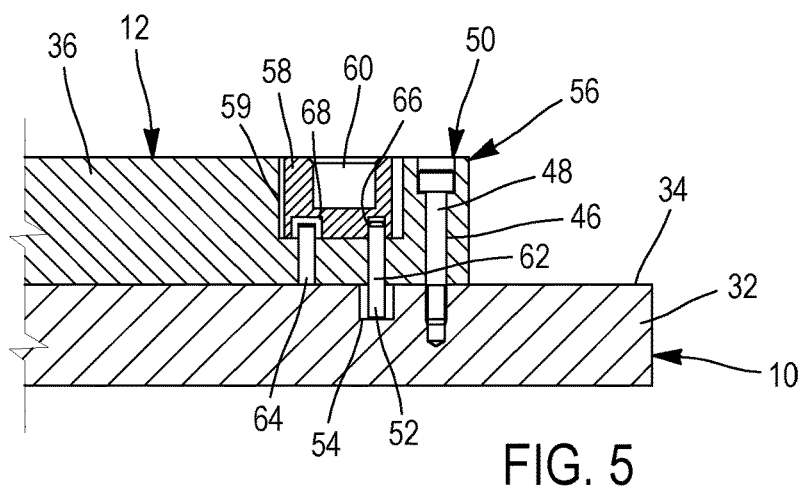
FIG. 5 is a detail view of the positioning means afforded by an additive manufacturing plate equipped with a stiffener according to the invention.

As FIGS. 3 to 5 show, the panel 36 comprises an upper face 42 that bears against the lower face 34 of the main body 32.

In order to maintain this contact, bores 46 and screws 48 are provided through the panel 36. More specifically, each edge 50 of the panel 36 is held by a row of four screws 48.

In order to make it easier to mount the stiffener 12 on the plate 10, two centering pins 52 are provided which project into two opposite corners 56 of the panel 36, centering bores 54 being provided in the main body 32 facing the centering pins 52.

In order to ensure the referencing of the plate 10 equipped with the stiffener 12 thereof inside the additive manufacturing machine, and for example with respect to the actuator 14, the panel 36 incorporates two centering means 58 in two opposite corners 56. The centering means 58 are incorporated since they are placed in housings 59 provided for this purpose in the panel 36.

Each centering means 58 comprises a housing 60 useful for referencing the plate 10 equipped with the stiffener 12 thereof inside the additive manufacturing machine, and for example with respect to the actuator 14 or a device for automated transfer of the plates.

In parallel, positioning means are also provided between each centering means 58 and the stiffener 12. Preferably, these positioning means comprise two pins 62 and 64 fixed in the panel 36, and the centering means 58 comprises a bore 66 for receiving a first pin 62 and an oblong hole 68 that receives the second pin 64, the oblong hole 68 allowing the second pin 64 to move in translation in a radial direction about the central island C in order to avoid statically indeterminate positioning.

Advantageously, one of the pins 62 or 64 can also be used to position the stiffener 12 with respect to the plate 10.

Of course, in parallel with the pins 62 and 64, screw fastening 70 between the centering means 58 and the panel 36 is provided.

Advantageously, the centering means 58 are made of a material having thermomechanical properties suitable for resisting wear and/or withstanding high temperatures without deterioration of their geometric precision. This makes it possible to reuse these centering means 58 on a new plate with the same stiffener or on a new plate with another stiffener. Nevertheless, in the event of premature wear, the centering means 58 can also be replaced independently of the stiffener 12 and of the plate 10.

The present invention also covers an additive manufacturing machine comprising an additive manufacturing plate 10 equipped with a stiffener 12 as has just been described, and the use of an additive manufacturing plate 10 equipped with a stiffener 12 in an additive manufacturing process.

The invention claimed is:

1. An additive manufacturing plate intended to serve as a support for the manufacturing of at least one component by an additive manufacturing process, the plate comprising:
   a monolithic main body that acts as a manufacturing support, the main body being in the form of a panel and comprising an upper face on which components are manufactured directly, and the length and the width of the main body panel being greater than the thickness of the main body panel; and
   a stiffener that is independent of the monolithic main body and secured to a lower face of the main body, the stiffener being in the form of a panel, the length and the width of the stiffener panel being greater than the thickness of the stiffener panel, and the stiffener panel being hollowed out in its thickness,
   wherein the stiffener panel is not hollowed out through its entire thickness, and
   wherein the stiffener panel is hollowed out in its thickness so as to exhibit a ribbed structure in its width and its length.

2. The additive manufacturing plate according to claim 1, wherein hollowed out portions of the stiffener panel open out only onto a lower face of the stiffener panel and not onto an upper face of the stiffener panel.

3. The additive manufacturing plate according to claim 1, wherein ribs of the stiffener panel form several branches around a central island situated at the center of the width and of the length of the stiffener panel.

4. The additive manufacturing plate according to claim 1, wherein the stiffener panel has a width less than the width of the main body panel and a length less than the length of the main body panel.

5. The additive manufacturing plate according claim 1, wherein the stiffener panel comprises a lower surface having an annular bearing surface for receiving a suction cup of circular section.

6. The additive manufacturing plate according to claim 1, wherein the stiffener panel incorporates two centering means in two opposite corners.

7. An additive manufacturing machine comprising an additive manufacturing plate according to claim 1.

8. An additive manufacturing process comprising:
   using an additive manufacturing plate according to claim 1 as a support for the manufacturing of at least one component.

\* \* \* \* \*